United States Patent [19]

Snyder

[11] 4,000,650

[45] Jan. 4, 1977

[54] METHOD AND APPARATUS FOR ULTRASONIC MATERIAL LEVEL MEASUREMENT

[75] Inventor: Ellery P. Snyder, Norwalk, Conn.

[73] Assignee: Bindicator Company, Port Huron, Mich.

[22] Filed: Mar. 20, 1975

[21] Appl. No.: 560,244

[52] U.S. Cl. .............................. 73/290 V; 340/1 L
[51] Int. Cl.$^2$ ............................................ G01F 23/28
[58] Field of Search ............ 73/290 V, 67.7, 67.8; 340/1 L, 15.5 DP; 343/5 DP, 12 R

[56] References Cited

UNITED STATES PATENTS

| | | | |
|---|---|---|---|
| 2,943,296 | 6/1960 | Fryklund | 340/1 |
| 3,102,261 | 8/1963 | Wippert | 343/5 |
| 3,258,769 | 6/1966 | Forrester | 343/7.5 |
| 3,278,770 | 10/1966 | Shoh | 310/3.1 |
| 3,422,435 | 1/1969 | Cragon | 343/17.1 |
| 3,611,370 | 10/1971 | Frasure | 343/7.5 |
| 3,738,749 | 6/1973 | Everest | 343/5 DP |
| 3,855,847 | 12/1974 | Leschek | 73/71.4 |

Primary Examiner—S. Clement Swisher
Attorney, Agent, or Firm—Barnes, Kisselle, Raisch & Choate

[57] ABSTRACT

Ultrasonic pulses are transmitted from the top of a tank or bin by a transducer and reflected by the material contained therein and received by the same transducer. In the short range mode, two millisecond pulses at sixty second intervals provide a measurment of from two to twenty one feet. Failure to detect a reflected pulse in the short range mode automatically switches the device to the long range mode utilizing ten millisecond pulses at three hundred millisecond intervals. After a pulse is transmitted the energy received by the receiver is converted to a digital value each millisecond and compared to the highest previously converted digital value so that the time of the largest received reflection signal and consequently the distance to the material surface may be determined. The echo signals from eight successive long range pulses are digitized and then integrated according to apparent object distance so that the sum of the true echo signals returned from the material surface is substantially greater than the sum of random noise signals for each transmitted pulse. After each eight-pulse long-range sequence, apparatus electronics automatically return to the short-range measurement mode to start a subsequent measurement sequence.

46 Claims, 6 Drawing Figures

METHOD AND APPARATUS FOR ULTRASONIC MATERIAL LEVEL MEASUREMENT

The present invention relates to distance measuring devices and, more particularly, to an ultrasonic device for measuring the level of material in a storage tank or bin.

It has heretofore been suggested that ultrasonic measuring techniques be used for monitoring or measuring the level of material in a storage tank or bin. As shown in the U.S. Pat. of Fryklund No. 2,943,296, for example, an ultrasonic transducer may be mounted to the top storage tank and may be directed to transmit pulses downwardly toward, and to receive echo pulses reflected upwardly from, the upper surface of a stored material, the transmitted or echo pulses traveling through the "head space" or air between the tank top and the material surface. Suitable electronic processing means, typically an analog signal processor, are provided to yield an indication of material level by measuring the round-trip transit time of a transmit/echo pulse sequence. Such analog signal processing equipment usually includes a threshold detector set to detect a response signal exceeding one-half of the expected response signal amplitude, a signal differentiator and a zero crossing detector to detect the maximum intensity of the response pulse. When used in connection with dust-producing materials such as wheat, flour, coal, and malt, or with sonic or ultrasonic noise-producing solid aggregates such as plastic or rocks, for example, or when used in a different environment wherein long-range measurements are required, as up to 150 feet for example, systems proposed by the prior art have generally proven unsatisfactory.

In the ultrasonic distance measuring art minimum measurement range depends, among other parameters, upon the length of the radiated or transmitted pulse, and upon recovery time of the radiating transducer. Where economic operation dictates that the entire storage capacity range of the storage tank must be used, a minimum measurement range of about 2 feet, which roughly corresponds to the minimum distance between the tank top and the material surface, and a maximum measurement range of over 150 feet which corresponds to the height of the tank may be required. Using a standard piezoelectric transducer a radiated pulse width of about 1 to 2 milliseconds is suitable for a two foot minimum measurement range, which pulse width together with all other radiated pulse widths set forth in the following specification and claims is specified full width at half-maximum pulse intensity. However, since the signal-to-noise ratio at the receiver is proportional to the square root of radiated pulse energy, a 2 millisecond pulse of limited intensity does not yield reliable results beyond about 25 to 50 feet. Conversely, where a longer pulse width is used as on the order of 10 milliseconds, minimum transit time and transducer recovery time do not allow the measurement range to approach the required 2 foot minimum.

Furthermore, techniques and apparatus proposed in the prior art, particularly those using a short radiated pulse width, are not suitable for use in conjunction with materials such as coal or grain where suspended dust between the transducer and the material surface may cause significant attenuation of radiated and echo pulses. False signals may be defined for purposes of the present application as random signals received at the transducer, but not necessarily originating at the transducer, which are not reflected from the material surface, or from any other stationary object or wall in the storage tank. Such random signals may be induced by external noise, for example. Nor are the prior art techniques and apparatus generally well suited for use where solid aggregate materials such as rocks are being continuously poured into the storage tank, causing spurious sonic and ultrasonic disturbances. Where it is attempted to improve signal-to-noise ratio using sophisticated analog signal processing techniques, the apparatus becomes too expensive to be economically feasible.

Moreover, it has been found that problems presented by technical parameters such as signal-to-noise ratio, antenna response and antenna directivity, for example, are often amplified when it is attempted to measure distance within a closed environment such as within a material storage tank. In an open or unconfined distance measuring system, a relatively small percentage of the energy radiated by the transducer is returned thereto in the form of echo signals, the remaining energy being dissipated in the surrounding environment. In a system for measuring material level within a storage tank, however, a much higher percentage of the radiated energy is eventually returned to the transducer directly from the material surface and/or after multiple reflections from the material surface, the tank walls and the tank top, etc. In such a confined system, it becomes particularly important to be able to select the true echo signal from the object of interest, in this case the upper surface of the stored material, from the other echo signals received after multiple reflections.

Accordingly, it is an object of the present invention to provide an economical and reliable ultrasonic distance measuring method and apparatus which are particularly well suited for material level control and which have a broad distance measuring range because of an enhanced signal-to-noise ratio.

It is a further object of the present invention to provide an ultrasonic material level control method and apparatus having a resolution of one foot or less over a broad distance measuring range.

In furtherance of the above-stated objects, it is another object of the present invention to provide a method and apparatus for ultrasonically measuring the level of material in a storage tank or bin in which the radiated pulse length and/or the echo signal processing technique is regulated as a function of measured distance.

It is another object of the present invention to provide an ultrasonic material level control method and apparatus in which, for a specified range resolution and accuracy, the level distance measuring capability is substantially increased.

It is a more specific object of the present invention to provide an ultrasonic material level control method and apparatus in which the effective signal-to-noise ratio at the receiver for the longest-measured distance is increased by a factor of substantially five.

According to one aspect of the present invention, distance measuring method and apparatus are provided which have particular application in a liquid or solid material level control environment. In such an environment, the distance between the top of the material bin or tank and the upper material surface is determined on the basis of the time required for an ultrasonic pulse to travel through air from a transducer mounted on the top of the tank to the material surface and back again. The return or echo pulses from each transmitted pulse are converted to digital signals, the values of which are indicative of the relative intensities of the several return pulses, and are stored in a shift register memory serially according to apparent distance. The digitized echo signals from successively transmitted pulses are added according to apparent surface distance so that the sum of the true echo signals returned from the surface of the material will be noticably greater than the sums of corresponding random noise signals for each transmitted pulse. After so processing the echo signals from eight transmitted pulses, for example, the true echo signal will have a normalized sum of eight while false signals induced by noise will have an average normalized sum of about 2.8. By using digital processing techniques, advantage is taken of the availability and low cost of a wide variety of integrated digital circuitry. This digital enhancement technique also increases the effective signal-to-noise ratio at the receiver by the square root of the number of pulses comprising a pulse sequence. In the example given, the increase in signal-to-noise ratio is equal to the square root of eight, or about 2.83.

According to another aspect of the present invention, method and apparatus are provided for automatically changing the distance or material level measuring range by regulating radiated pulse width and pulse repetition frequency as a function of measured distance. In the specific embodiment disclosed which has an overall measuring range of 2 to 158 feet, system electronics first transmit a single short-range measuring pulse of 2 milliseconds duration and respond to an echo signal within the measuring range of two to 21 feet. A direct indication of measured distance or material level is provided in the short-range measuring mode without using the digital enhancement technique discussed above. The system further detects the successful completion of a short-range measurement i.e., between 2 and 21 feet - and stays in the short-range mode so that succeeding transmitted pulses also have the short-range pulse duration of 2 milliseconds and are repeated every 60 milliseconds. This 60 millisecond pulse repetition period is determined by maximum pulse transit time (42 milliseconds for a material depth of 21 feet) and transducer recovery time which together establish a minimum repetition period, and by the desired repetition rate of the short-range measurement sequence.

Should any short-range measurement attempt be unsuccessful, - i.e., response time in excess of the 21 foot range limit - the system automatically switches to the long-range measurement mode having a distance measuring range of 14 to 158 feet and in which a pulse having a duration of 10 milliseconds is transmitted every 300 milliseconds. Thus, an unsuccessful short-range measurement is followed by a long-range measurement preferably comprising an eight pulse sequence subject to the digital enhancement technique. After the long-range measurement has been completed, the system automatically returns to the short-range measurement mode. By increasing the radiated pulse width, the signal-to-noise ratio at the receiver is increased by the ratio of the square roots of the pulse widths or, in the example given, by about two and one-quarter. Thus, by combining the digital enhancement and automatic range changing techniques, the effective signal-to-noise ratio at the receiver for the longest-measured distance is increased by a factor of substantially five.

The novel features which are considered characteristic of the present invention are set forth in particular in the appended claims. The invention itself, however, together with additional objects, features and advantages thereof will be best understood from the following description when read in conjunction with the accompanying drawings in which:

Figure 1:
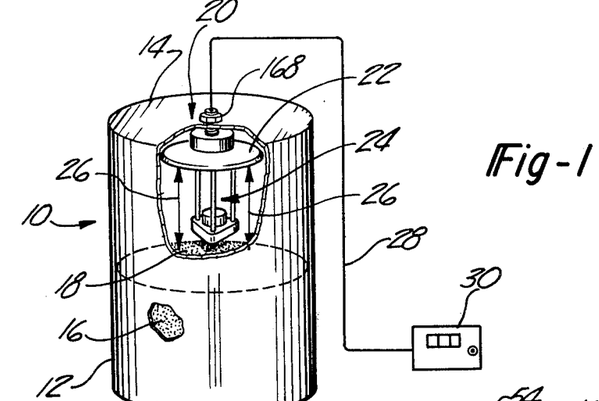
FIG. 1 is a perspective view, partially in section, of a material storage tank in which material level is monitored in accordance with the present invention, the transducer being shown on an enlarged scale relative to the tank.

Referring to FIG. 1, a material storage tank 10 is depicted as having a cylindrical side wall 12 and a top 14. A material 16 which may be a liquid, or a solid such as grain, coal or rocks, for example, is stored in tank 10 and has an upper surface 18 which is to be monitored to provide an indication of material level. It will be understood that tank 10 may be made of any suitable material and will be provided with suitable means (not shown) for filling and draining material 16 into and from the tank.

In accordance with the present invention, a transducer assembly 20 is interiorly mounted to depend from tank top 14 and comprises a parabolic reflector 22 and an ultrasonic transducer 24 mounted at the reflector focus. Reflector 22 directs or reflects ultrasonic pulses emanating upwardly from transducer 24 downwardly toward surface 18 as at 26 and, similarly, receives echo pulses reflected upwardly from surface 18, and reflects and directs the echo pulses to transducer 24, the transmitted and echo pulses traveling through the "head space" or air between tank top 14 and material surface 18. Transducer assembly 20 is connected by means of a coaxial cable 28 to material level control electronics 30 which are shown in block form in FIG. 2. A suitable transducer assembly 20 and the components thereof are shown in FIGS. 3–6.

Figure 2:
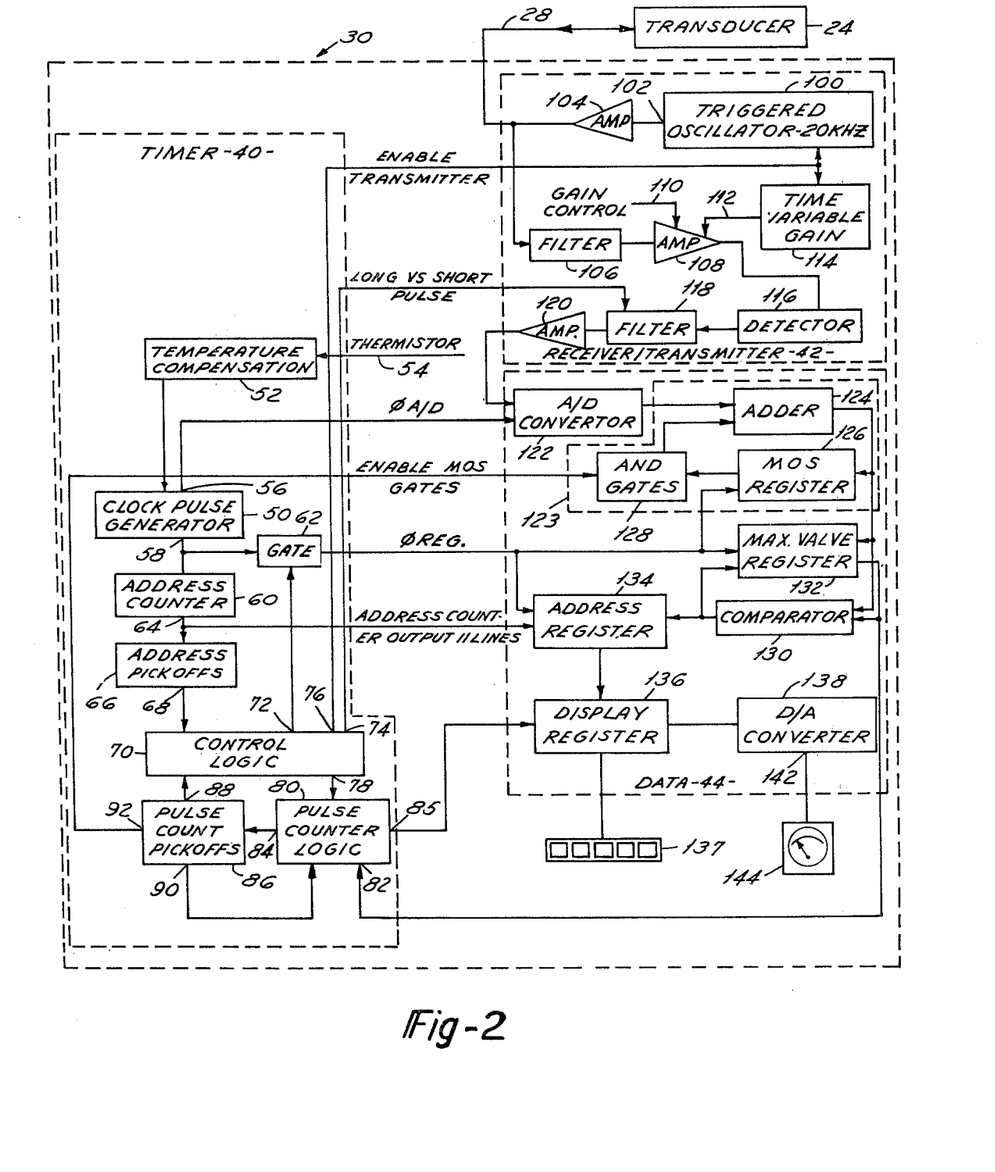
FIG. 2 is a block diagram which shows a presently preferred embodiment of the ultrasonic material level control apparatus of the present invention for performing the method of the invention.

Referring to FIG. 2, material level control electronic signal processing apparatus 30 provided by the present invention includes, in general, a timer circuit 40 which generates the necessary timing pulses and control signals, and has a clock pulse generator which is compensated for ambient temperature changes within the material storage tank and thus for temperature-induced changes in the speed of the transmitted ultrasonic pulses through air. A receiver/transmitter (r/t) circuit 42 is triggered by timer 40 to send a crystal energizing pulse via cable 28 to transducer 24. Echo response pulses reflected from surface 18 (FIG. 1) are collected and converted to electrical signals by transducer 24, and fed through appropriate filters and amplifiers in r/t circuit 42 to a data control circuit 44 which performs the necessary computations to determine the level of the material in question. A direct indication of the distance between transducer assembly 20 and surface 18, which is a function of material level, is provided on a digital display and/or a galvanometric analog meter.

Figure 3:
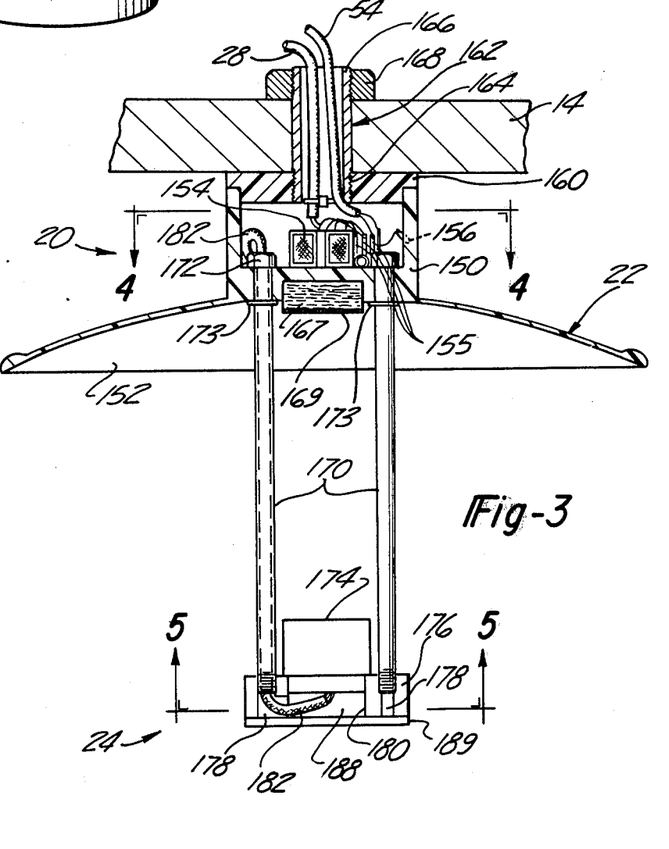
FIG. 3 is a sectional view vertically bisecting the transducer assembly shown in FIG. 1.
Figures 4, 5:
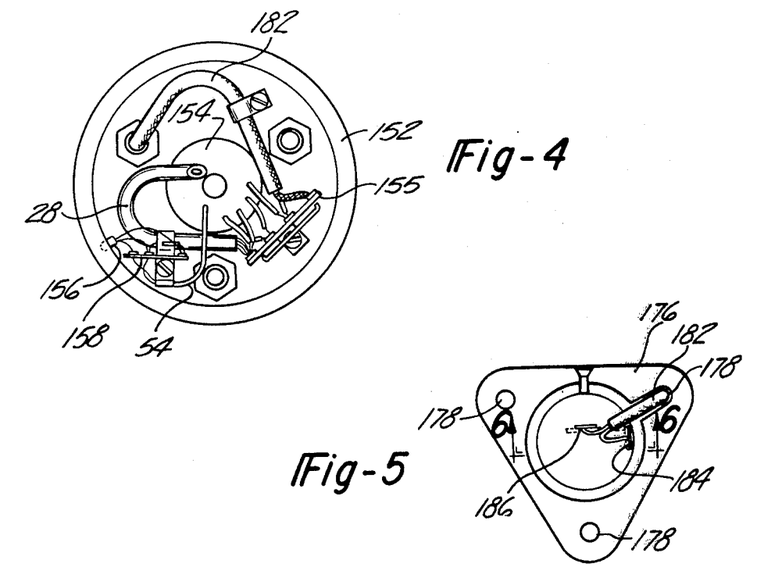
FIG. 4 is a sectional view taken along the line 4—4 of FIG. 3.
FIG. 5 is a sectional view taken along the line 5—5 of FIG. 3.

Turning now to the details of FIG. 2, timer 40 includes a clock pulse generator 50 which is connected through a temperature compensation circuit 52 and then via a cable 54 to a thermistor mounted to transducer assembly 20 as shown in FIGS. 3 and 4. The outputs 56, 58 of pulse generator 50 have a nominal frequency of about 1KHz but vary about this nominal frequency as a function of tank temperature. Preferably, outputs 56, 58 have a repetition period corresponding exactly to the travel time of a 20KHz radiated pulse through one foot of air at the temperature of the storage tank. Since each radiated pulse must twice travel the distance between transducer assembly 20 and material surface 18, once as a "transmitted" pulse and once as an "echo" pulse, each foot of pulse travel corresponds to one-half foot of the level measurement in question. Stated differently, each output pulse from generator 50 corresponds to exactly one-half foot of measured distance. Output 56 is connected directly to data circuit 44 while output 58 is connected to an address counter 60 and through a gate 62 to date circuit 44. Address counter 60 counts in binary coded decimal (BCD) with each increment representing a measured distance of exactly one-half foot. Thus, to have a maximum distance measuring range of 158 feet, counter 60 must have a 316 count capacity. In a preferred embodiment of the present invention for this maximum distance measuring range, counter 60 has a capacity of 400 counts with counts 317 to 399 being used for other control purposes, and particularly for control of the pulse timing and pulse width of the radiated pulse.

An output 64 of address counter 60 is fed to an address pickoff circuit 66 which recognizes selected addresses, e.g., distances of particular interest, and feeds these addresses via an output 68 to a control logic circuit 70. Addresses or distances of particular interest are two feet and 21 feet which set the limit of the short-range measurement mode, and 14 and 158 feet which set the range of the long-range measurement mode. As will be explained in detail hereinafter, other addresses used for control of the pulse radiated by transducer 24 are also of particular interest and are detected by pickoff circuit 66. Counter output 64 is also fed to data circuit 44.

Control logic 70 has a first output 72 connected to gate 62 to pass generator output 58 to data circuit 44 only during the time corresponding to the distance range of interest. During the short-range measurement mode generator output 58 is gated to data circuit 44 to look for an echo pulse corresponding to a measured distance between 2 and 21 feet. Similarly, during a long-range measurement, generator output 58 is fed to data circuit 44 only when echo pulses from a distance between 14 to 158 feet may be expected. A long/short-range control logic output 74 is connected to r/t circuit 42 to control the receiver post-detection bandwidth as an inverse function of pulse length. A transmitter enable control logic output 76 is connected to r/t circuit 42 to enable either the transmitter or the receiver portion of that circuit.

Control logic 70 has a fourth output 78 connected to a pulse counter logic circuit 80 which monitors or counts radiated pulses in both the short and the long-range modes. Counter 80 receives and monitors a threshold input 82 from data circuit 44 which indicates during the short-range mode that an echo pulse greater than a predetermined threshold intensity has been received. Counter 80 has an output 84 connected to a pulse count pickoff circuit 86 which recognizes selected critical pulse counts and provides an output at 88 to control logic 70, an output at 92 to data circuit 44, and a reset output at 90 to pulse counter 80. Pulse counter 80 also has a display command output 85 which directs data control circuit 44 to display the measured distance after termination of a measurement sequence.

Receiver/transmitter circuit 42 includes a 20 KHz triggered oscillator 100 which is triggered by control logic transmitter enable output 76 to provide a signal at oscillator output 102 having a duration which is a direct function of the duration of the transmitter enable signal. As indicated above, output 102 will have a duration of ten milliseconds in the long-range measuring mode, and a duration of two milliseconds in the short-range measuring mode. Oscillator output 102 is connected through an amplifier 104 to transducer 24 which is preferably a crystal transducer mounted at the focus of the parabolic reflector 22 as shown in FIG. 1.

The receiver portion of r/t circuit 42 includes a bandpass filter 106 having an input connected to transducer 24 to improve receiver signal-to-noise ratio. The output of filter 106 is connected to a preamplifier 108. Amplifier 108 also receives an input 110 from a manually adjustable gain control such as a potentiometer, and an input 112 from a time variable gain control 114 which is activated by control logic transmitter enable output 76 to suppress receiver gain during transmission of a radiated pulse and to gradually allow the gain of amplifier 108 to return to normal as a linear function of time. During this period, reflected signals are relatively strong, signal intensity being inversely proportional to the square of the distance, and suppression of receiver gain tends to offset the wide range of echo signal amplitudes over the short-range measuring range. For reasons which will become clear from the discussion to follow, time variable gain control 114 must be active only over distances shorter than the long-range minimum distance, i.e., less than fourteen feet. For this reason the time duration of gain control 114 is preferably fixed between 10 and 28 milliseconds, as by a resistor/capacitor discharge circuit, and does not vary as a function of measured distance. The output of amplifier 108 is fed to a detector 116 and thence to a matched filter 118 which is preferably a four pole Butterworth filter having a frequency bandwidth controlled by control logic output 74 in inverse proportion to radiated pulse width. The output of filter 118 is fed through an amplifier 120 to data circuit 44.

In accordance with the signal enhancement feature of the present invention the echo response pulses from amplifier 120 are fed into data circuit 44 to an analog-to-digital (A/D) converter 122 which is gated by clock pulse generator output 56 to sample the return signals as a function of material surface distance, preferably once each millisecond. A/D converter 122 converts each sampled resonse or echo pulse into a digital number having a numerical value indicative of the intensity of each of the pulses relative to one another. Any convenient digital code, such as binary coded octal, may be used. Where the distance to be measured is in the range from 14 to 158 feet the maximum round-trip transit time is 288 milliseconds; so 288 sample conversions are made by converter 122.

The digitized and sampled echo signals are fed from convertor 122 to a digital integrator 123 in which the digitized echo signals from successively transmitted pulses are integrated, i.e., summed according to apparent surface distance. Integrator 123 includes a bit-parallel adder 124 in which the digitized and sampled echo signals are added to the sum of the corresponding sampled signals from previously transmitted pulses, the sum being then fed to an MOS (metal-oxide semiconductor) storage shift register 126 which stores the successive integrated pulses according to apparent surface distance. For the first-transmitted pulse of a statistical series the output of sum storage register 126 is blocked from adder 124 by multiple AND gates 128 which receive a gating input signal from pulse count pickoff circuit output 92. The digitized response signals from the first-transmitted pulse are thus stored directly in register 126. Thereafter, the register is shifted and gated to adder 124 to perform the above-described successive summations.

As indicated above, the signal enhancement technique of the present invention insures that, after a series of eight (or less) transmitted pulses, the sum of the true echo pulses will be greater than any corresponding sum of random pulses induced by noise, etc. Since the system is only interested in this true echo sum, a comparator 130 monitors the output of adder 124 and compares this output with the output of a maximum value register 132. When the output of adder 124 is greater than the output of register 132, the data in register 132 is replaced by the adder output. At the same time, comparator 130 triggers an address register 134 which receives an address input from address counter output 64, and which stores the address or apparent distance of the new maximum value in register 132. At the end of a series of eight transmitted pulses, the signal in address register 134 corresponds to the actual distance between transducer assembly 20 and material surface 18 (FIG. 1) from which the true echo signals were returned. This signal is clocked into a digital display register 136 by pulse counter output 85. The distance-indicating contents of register 136 are fed to a suitable digital display 137, such as an LED display, and to a D/A converter 138 which has an output 142 connected to a galvanometric analog meter 144. Display 137 and meter 144 are preferably calibrated in terms of measured distance in units of feet. The output of maximum value register 132 is also connected to pulse counter logic threshold input 82.

When the material level control system is operating in the short-range mode, pulse count pickoff output 92 blocks the output of MOS register 126 from the input to adder 124 so that, for each radiated pulse, the digital value of the highest intensity return signal is stored in maximum value register 132, and the address or apparent distance corresponding to this maximum intensity return signal is stored in address register 134. Material level or distance is, therefore, displayed after each short-range pulse in display register 136 and on meter 144.

It will be appreciated that the above-described digital enhancement technique, and particularly the maximum value sensing technique, provide several inherent advantages over conventional analog processing techniques, particularly in a material level control environment. For example, the digital circuits required are readily available from a wide variety of manufacturers and are relatively low in price. Furthermore, the maximum value sensing technique allows proper performance of the system regardless of absolute gain and/or gain variations of the rest of the level detection system. Overall system gain is a function of several factors, such as transmitted pulse intensity, reveiver response including amplifier gains, and the reflection coefficient of material surface 18 (FIG. 1) which may vary from about 0.66 for solid aggregate spheres to as low as 0.01 for grain products. Some of these properties may be variable or unknown so that setting a threshold for pulse detection as required in a conventional analog signal processor is often difficult or even impossible. By comparing response pulse intensities to each other rather than to a fixed standard, these difficulties are avoided according to the present invention.

Furthermore, the digital enhancement technique, and particularly the maximum value sensing technique, allow the system provided by the present invention to operate in conjunction with materials such as grain or coal which may produce large quantities of dust suspended in the air above surface 18 (FIG. 1) when material is poured into the storage tank. The radiated and reflected ultrasonic signals may be severely attenuated by dust during and immediately after the filling operation, but may later pass through the air with relatively little attenuation after the dust has had an opportunity to settle. It has also been found that convection currents within the tank may cause loss of return signals at the transducer for a significant portion of the pulse sequence time. It will be apparent that the intensity of the echo signals may vary widely under these circumstances even though the material level remains relatively constant. Conventional material level control systems which compare the intensity of an echo signal to a predetermined standard, such as expected half-intensity, are unsuitable in such as application since the threshold would have to vary according to dust conditions. The present invention, however, which is only interested in the relative intensities of the echo signals, i.e., as compared to each other, is ideally suited to such dusty applications and is operable independently of changes in dust conditions. The time duration of the long-range measurement sequence, which includes the digital enhancement technique, is only about three seconds, during which time the dust conditions cannot be expected to change significantly.

Operation of control electronics 30 will be evident from the foregoing description and may be summarized as follows. Control logic 70 detects a predetermined address from pickoff 66, for example a minus three or, stated differently, a count of 397 in a four hundred bit counter, and sends a transmitter enable signal via output 76 to triggered oscillator 100. After two milliseconds, i.e., when the address count reaches minus one or three hundred ninety-nine, the transmittr enable signal is extinguished so that the signal radiated from transducer 24 has a duration of only 2 milliseconds. Output 74 indicates a short-range mode of operation so that receiver filter 118 has maximum bandwidth. One pulse is provided at control output 78 to pulse counter 80. Control output 72 is now in the short-range mode, thus blocking shift pulses from generator output 58 to data circuit 44.

Response pulses are sampled and digitized as described above and selectively loaded into maximum value shift register 132. When the digital number in register 132 exceeds one-half of the maximum expected intensity threshold input 82 of pulse counter logic 80 is triggered. If control logic 70 detects that the measured distance is between 2 and 21 feet (via address pickoff 66), pulse counter 80 is then reset and a signal is sent via output 85 to display register 136 to load the address in register 134, which is the distance associated with the signal in maximum value register 132, into the display register for display on readout 137. With the pulse count reset to zero, control logic 70 again attempts a shortrange measurement as described.

When threshold input 82 is not triggered within the 2 to 21 foot range, control logic 70 automatically switches to the long-range operating mode. The next transmitter enable signal at output 76, the first of the eight pulse longrange sequence, will have a 10 millisecond duration extending from address counts 388 to 398, for example. Filter 118 is placed in the narrowband mode by control output 74. At an address count of 28, corresponding to fourteen feet, control output 72 gates pulses from generator 50 to shift MOS register 126, maximum value register 132 and address register 134, which shift the register 126 at each one-half foot interval and which allow properly sequenced loading of registers 132,134 when enabled by comparator 130. Gates 128 feed the output of receiver 126 to adder 124 only when pulse count pickoff 86 indicates a pulse count of three through nine, corresponding to long-range pulses two through eight. After eight long-range pulses, display register 136 is triggered to provide a digital display of measured distance. At the same time, the pulse count is reset to zero so that the next measured attempt made by control logic 70 is a short-range measurement attempt as described above.

Operation of signal processing apparatus 30 and associated transducer 24 in the mode described represents a preferred form of performing the material level monitoring method of the present invention. In this method, a first ultrasonic pulse having a first pulse width and a first pulse repetition period is transmitted vertically from transducer 24 mounted to the top of storage tank 10 downwardly toward the upper surface 18 of the material. Pulses echoed from the material surface in response to the first transmitted pulse are monitored, as by the aforementioned interaction of comparator 130, register 132 and logic 80, for a preselected time after transmission of the first transmitted pulse, which time corresponds to a preselected distance range to the material surface which is preferably a short-range distance between 2 and 22 feet. When an echo pulse is received within this preselected time, a numerical indication of material level is displayed, as at displays 137 and/or 144, and the first ultrasonic pulse is retransmitted. When an echo pulse from the first transmitted pulse is not received within the preselected time period corresponding to the short-range distance, a second ultrasonic pulse having a second pulse width different from the first pulse width and a second pulse repetition period different from the first pulse repetition period is transmitted vertically toward the material surface. Echo pulses from the second transmitted pulse are monitored within a second preselected time frame, as by the aforementioned operation of logic 70 and gate 62 relative to integrator 123 and register 132. Preferably the second time frame corresponds to a longer distance measuring range of 14 to 158 feet. From response pulses within this time frame an indication of material level is provided. After each long-range measurement sequence, a shortrange measurement sequence is automatically restarted, as by the aforementioned operation of control logic 70, logic 80 and pickoff circuit 86, to again transmit the first ultrasonic pulse.

According to another aspect of the method provided by the present invention as applied to material level control, a sequence of pulses, preferably comprising eight of the second ultrasonic pulses, is transmitted toward material surfce 18. Echo response pulses reflected from the material surface are received by transducer 24, each such response pulse being then converted in converter 122 to a digital number having a value indicative of the intensity of that pulse relative to other response pulses similarly received. Response pulses from successively transmitted pulses of the eight-pulse sequence are integrated or summed in digital integrator 123 according to apparent distance to the surface. After termination of the eight-pulse sequence, the integrated response pulse having the highest digital value is selected by comparator 130 and register 132, and the apparent material surface distance associated with this highest-value integrated pulse is then identified and treated as an indication of acutal material surface distance. This actual distance is automatically made available in register 134 and may be displayed at 137 and/or 144.

The present invention has been thus far described in detail with reference to a presently preferred embodiment thereof which, in the long-range mode of operation, yields a signal-to-noise ratio at the receiver for the longest-measured distance which is increased by a factor of more than five, thereby improving upon conventional analog processing material level control devices. Consequently, the maximum distance measurable has been correspondingly increased by a factor of five. The preferred embodiment further yields a material depth resolution of one foot or less at a distance of one hundred fifty feet under the highest anticipated noise condition. However, the present invention is not to be construed as being limited to the pulse widths, pulse repetition frequencies or the number of integrated pulses presently preferred since these values may change under varying conditions. For example, the preferred short-range pulse width of 2 milliseconds allows a 2 foot minimum distance measurement without unduly increasing the bandwidth requirements of filters 106,118 and amplifiers 108,120. Obviously, where a minimum depth measurement of only 3 or 4 feet is required, for example, the short-range pulse width may be correspondingly increased with consequent reduction in the band width requirements for the recevier filters and amplifiers. Similarly, the preferred long-range pulse width of 10 milliseconds has been mathematically selected as being long enough to yield the desired increase in signal-to-noise ratio while short enough to yield a resolution of 1 foot at a depth of one hundred fifty feet. Again, where anticipated noise conditions and/or required resolution accuracy change, the long-range pulse width may be varied accordingly.

Furthermore, while the present invention has been described in connection with a material level control system in which a single transducer is rigidly and fixedly mounted to the top of a material storage tank and is monitored by control electronics in a 1/1 transducer/electronics ratio, it will be apparent that other transducer and/or control electronics configurations may be advantageous. For example, control electronics 30 disclosed in connection with FIG. 2 would be useful in a material level control environment in conjuction with a movable or moving transducer. An example of such a transducer would be one that is rigidly mounted to the tank top but which swivels or pivots about its mounting point in a periodic pattern so as to direct radiated pulses toward the material surface at selected angles, thereby "sweeping" an enlarged material surface area. Another example of a mobile transducer would be one that is rigidly mounted in the vertical direction but which moves as on a boom or beam in a plane below the tank top so as to, again, sweep an enlarged surface area in a preselected pattern. In either such application, the material control system 30 provided by the present invention may be used to "mpa" the contour of the upper surface of the material. Additional control circuitry to correlate transducer position with measuring distance must, of course, be provided. Such additional circuitry is generally well known to those skilled in the art.

Control circuit 30 discussed in connection with FIG. 2 may also be readily adapted for use with multiple transducers, each transducer being mounted to the top of an individually selected storage tank. In this application, circuitry for selecting one transducer from the plurality of transducers, such as a rotray switch or a stepping relay, would be provided at the output of amplifier 104 (FIG. 2). Additionally, circuitry correlating measured distance with the selected transducer, i.e., the selected material storage tank, would also be provided.

The structure of a presently preferred embodiment of transducer assembly 20 is shown in detail in FIGS. 3–6 which are all drawn to scale. Referring to FIGS. 3–5, parabolic reflector 22 is molded of plastic-reinforced fiber glass and includes an integral cylindrical reflector housing 150 extenting vertically from the reflector proper 152. Enclosed within housing 150 is an impedance matching pulse transformer 154 having primary and secondary windings wound upon a toroidal core of ferromagnetic material in a preferred secondary/primary winding ratio of 5/1. By thus providing the pulse transformer in the transmitter/transducer line, the transmitter and transducer are respectively matched to the line impedance while, at the same time, a 25/1 impedance increase between the line and the transducer is achieved. This results in a significant improvement in power transmission efficiency between the transmitter and transducer, and the transducer and receiver. Moreover, location of the pulse transformer at the transducer remotely of the control electronics allows the use of a low impedance cable to connect the control electronics to the transducer and places the high voltge circuits of the system within a protection enclosure at the transducer.

The transformer windings are connected to a terminal strip 155, the primary winding being then connected to r/t circuit 42 (FIG. 2) via cable 28. A thermistor 156, the purpose of which was discussed above in connection with FIG. 2, is imbedded in the wall of housing 152 and is connected via a second terminal strip 158 (FIG. 4) and cable 54 to timer circuit 40 (FIG. 2).

A reflector housing cover 160 is press fitted over and bonded to housing 152 and receives one threaded end 164 of a transducer mounting nipple 162. Housing 152 is then filled with a suitable encapsulant such as RTV. A second threaded nipple end 166 is adapted to receive a locking nut 168 to firmly secure transducer assembly 20 to tank top 14. A fiber glass acoustic absorber block 167 is centrally mounted in reflector 154 opposite transducer 24 to inhibit generation of standing waves between the transducer and the reflector. Block 167 is held in place by a screen 169.

Three parallel, hollow, nickel plated steel rods or tubes 170 are secured to reflector 22, as by nuts 172 and grip rings 173, and support ultrasonic transducer 24 at the reflector focus. A triangular mounting block 176 of plastic-reinforced fiber glass has the threaded holes 178 at respective triangle apexes to receive the respective threaded ends of support tubes 170. The open end of a transducer cup assembly 174 is axially pressed into a central bore 180 in block 176. A cable 182 is connected to terminal block 155 and then fed through one of the support tubes 170 to connect the secondary of transformer 154 to the cup assembly terminals 184,186. The cavity 188 (FIG. 3) formed by cup assembly 174 and block 176 is filled with RTV encapsulant, and a cover 189 is bonded to block 176 to cover the cavity and tube holes 178.

Figure 6:
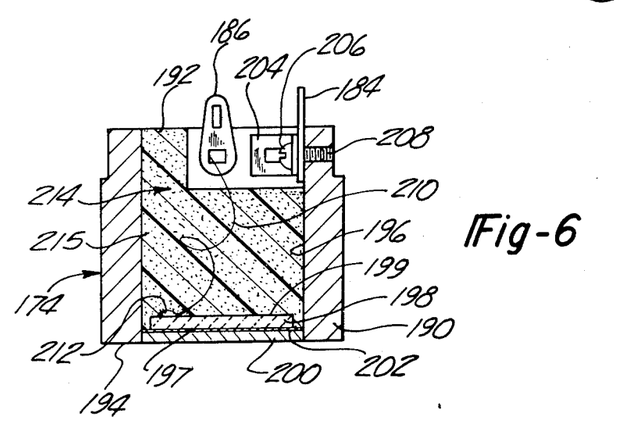
FIG. 6 is a sectional view laterally bisecting the transducer cup assembly shown in FIGS. 1, 3 and 5 but inverted relative to FIG. 3, and is taken along the line 6—6 of FIG. 5.

Referring now to FIG. 6, transducer cup assembly 174 includes a hollow aluminum shell 190 having an axial cylindrical bore 196 opening at shell ends 192,194. A piezoelectric crystal 198 having opposed, parallel front and back faces 197, 199 is adhered to an aluminum transducer face plate or diaphragm 200 by a layer 202 of bonding material. When crystal 198 is energized by r/t circuit 42 (FIG. 2), the crystal and diaphragm 200 form an oscillating "composite beam" which is subjected to internal bending stresses. The neutral bending axis of the crystal/diaphragm combination is preferably located in bonding layer 202, or within diaphragm 200 closely adjcent the bonding layer to insure that crystal 198 is subjected to either tensile or compressive stresses, but not simultaneously to both, thereby reducing the likelihood of crystal or diaphragm facture, or separation of the crystal from the diaphragm. The bonding agent is preferably conductive, such as silver-doped epoxy or silver-loaded solder. Diaphragm 200 is pressed into end 194 of shell 190 with an interference fit after one or both of the interfitting peripheral surfaces have been coated with a suitable anaerobic filling agent to fill in the gaps between the diaphragm perimeter and the shell wall.

A terminal strip 204 is mounted to shell 190 by a screw 206 received into a corresponding threaded opening 208 in the shell wall. Terminal 184 is electrically connected to screw 206, and thence to shell 190, diaphragm 200, bonding layer 202 and crystal face 194 to connect that crystal face to grund via cable 182. Terminal 186 on strip 204 is connected to back crystal face 199 via a conductor 210 and a solder joint 212.

An acoustical absorber block 214 fills the remainder of cavity 196 and is preferably comprised of resilient synthetic material such as RTV and a nonconductive particulate material such as sand or quartz mixed in a RTV/particle ratio of 5/1 to 20/1 by weight. The particulate material, indicated in FIG. 6 as grains 215, increases the density of absorber 214, and helps break up and absorb the ultrasonic waves emanating from crystal back face 199. The RTV/particle mixture also lowers the Q of the transducer, which is generally defined in the transducer art as the ratio of the resonant frequency divided by the bandwidth at the transducer half power point. A Q in the range between 14 and 17 is presently preferred in material level control applications. The Q of the cup assembly without the RTV/particle absorber has been found to be generally between 70 and 90. It has also been found that absorber 214 lowers the resonant frequency of the assembly by 200 300 Hz.

The ultrasonic transducer assembly 20 shown in FIGS. 1 and 3–6 herein is the subject of a copending application of Walter E. Levine, Ser. No. 560,245, filed on even date herewith and assigned to the assignee hereof. Said copending application, which discusses transducer 20 in greater detail, is incorporated herein by reference. Except for the aforementioned feature characterized by abosrber block 167 and impedance matching pulse transformer 154, in association with control electronics 30, the transducer structure disclosed herein does not, of itself, form part of the present invention. However, it does constitute part of the presently preferred mode for practicing the method and using the apparatus for ultrasonic material level control provided by the present invention.

From the foregoing description it will now be apparent that the ultrasonic material level control method and apparatus provided by the present invention fully satisfies all of the objects, features and advantages set forth above. While the method and apparatus have been disclosed in conjuction with one particular embodiment thereof, it will be apparent that many alternatives, modifications and variations will suggest themselves to persons skilled in the art in view of the foregoing description. Accordingly, the present invention is intended to embrace all such alternatives, modifications and variations as fall within the spirit and broad scope of the appended claims.

The invention claimed is:

1. In a control system for use in monitoring the level of material in a storage tank, the combination comprising,
    transducer means directing ultrasonic pulses toward and receiving echo response pulses reflected from the upper surface of said material,
    means operatively connected to said transducer means to sample said echo response pulses at preselected intervals which are a function of distance,
    means converting each of said sampled response pulses to digital signals having a numerical value indicative of the intensity of each said echo pulse relative to one another,
    means integrating said sampled and digitizesd response pulses from successively transmitted pulses over a preselected pulse sequence according to apparent distance of said transducer means from said material surface,
    means storing said integrated response pulses serially according to apparent distance, and
    means monitoring said integrated pulses to provide an indication of actual distance, which is a function of material level, upon completion of said pulse sequence.

2. The combination st forth in claim 1 wherein said transducer means is mounted to the top of said tank and is disposed to direct said ultrasonic pulses downwardly toward and to receive said response pulses reflected upwardly from said surface.

3. The combination set forth in claim 1 wherein said integrated pulse monitoring means comprises,
    first digital sotrage reister means for storing digital data,
    means operatively connected to said integrating means comparing an integrated pulse in said integrating means with digital data stored in said first storage register means,
    means responsive to said comparing means for storing said integrated pulse in said first storage register means when said integrated pulse is greater than said stored data,
    second storage register means for storing digital data, and
    means responsive to said comparing means to store an apparent material surface distance associated with said integrated pulse stored in said second storage register means when said integrated pulse is greater than said stored data.

4. The combination set forth in claim 3 further comprising display means operatively connected to said second storage register means for providing a display of said actual distance upon completion of said pulse sequence.

5. The combination set forth in claim 4 wherein said display means comprises digital display means.

6. The combination set forth in claim 4 wherein said display means comprises a galvanometer and digital-to-analog signal converting means operatively connecting said second storage register means with said galvanometer.

7. The combination set forth in claim 3 wherein said pulse sequence comprises one pulse.

8. The combination set forth in claim 1 wherein said pulse sequence comprises eight pulses.

9. The combination set forth in claim 1 wherein said preselected sampling intervals are regulated as a function of temperature within said tank.

10. The combination set forth in claim 9 wherein each of said intervals corresponds to one-half foot of apparent distance between said transducer means and said material level.

11. The combination set forth in claim 1 wherein said sampling means samples said response pulses in a range of apparent distance from 14 to 158 feet.

12. In the method of monitoring the level of material in a storage tank on the basis of the roundtrip transit time of an ultrasonic pulse between a transudcer and the upper surfce of said material, the improvement comprising the steps of:
    transmitting a sequence of ultrasonic pulses toward an upper surface of said material,
    receiving echo response pulses reflected from said surface,
    converting each of said echo response pulses to a digital number having a value indicative of the intensity of each of said pulses relative to one another,
    integrating said response pulses from successively transmitted pulses of said sequence according to apparent distance to said surface,
    selecting an integrated response pulse having highest digital value after termination of said pulse sequence, and
    identifying the apparent material surface distance which is associated with said highest-value integrated pulse and treating said apparent distance as actual material surface distance.

13. The method set forth in claim 12 wherein said sequence of ultrasonic pulses comprises eight pulses.

14. In a control system for use in monitoring the level of material in a storage tank the combination comprising,
transducer means mounted to the top of said tank transmitting ultrasonic pulses downwardly toward and receiving echo response pulses reflected upwardly from the upper surface of said material, and
means responsive to elapsed time between a first of said transmitted pulses and a corresponding response pulse for regulating the pulse width of a second transmitted pulse subsequet to said first transmitted ulse as a function of said elapased time.

15. In a control system for use in monitoring the level of material in a storage tank the combination comprising,
transducer means transmitting ultrasonic pulses toward and receiving echo response pulses relfected from the upper surface of said material, and
means responsive to elapsed time between a first of said transmitted pulses and a corresponding response pulse for regulating the pulse width and the pulse repetition period of a second transmitted pulse subsequent to said first transmitted pulse as a function of said elapsed time.

16. The combination set forth in claim 15 wherein said transducer means is mounted to the top of said tank and is disposed to direct said ultrasonic pulses downwardly toward and to receive said response pulses reflected upwardly from said surface.

17. The combination set forth in claim 15 wherein said subsequent pulse regulating means comprises,
means monitoring said response pulses to porvide a first control signal when elapsed time between said first transmitted pulse and said corresponding received pulse indicates an apparent distance from said transducer means to said material surface within a preselected range interval,
means monitoring said response pulses to provide a second control signal when said apparent distance is outside of said preselected range interval, and
means responsive to said first and second control signals for regulating said pulse width and said pulse repetition period of said second transmitted pulse.

18. The combination set forth in claim 17 wherein said first and second signal responsive means comprises,
means operatively connected to said transducer means and responsive to said first control signal to produce a second transmitted pulse having a pulse width and pulse repetition period identical to that of said first transmitted pulse, and
means operatively connected to said transducer means and responsive to said second control signal to provide a second transmitted pulse having a second pulse width and a second pulse repetition period directly proportional to said apparent distance.

19. The combination set forth in claim 18 wherein said preselected range interval is a short-range interval and wherein said second control signal responsive means is responsive to said apparent distance being beyond said short-range interval to provide a second transmitted pulse having a greater pulse width and a greater pulse repetition period than said first transmitted pulse.

20. The combination set forth in claim 19 wherein said short-range interval is between 2 to 21 feet.

21. The combination set forth in claim 18 wherein said first pulse width is substantially equal to two milliseconds and said first pulse repetition period is substantially equal to 60 milliseconds, and wherein said second pulse width is substantially equal to 10 milliseconds and said second pulse repetition period is substantially equal to 300 milliseconds.

22. In a method of monitoring the level of material in a storage tank as a function of the round-trip transit time of an ultrasonic pulse between a transducer and the upper surface of said material, the improvement comprising the steps of:
a. transmitting a first ultrasonic pulse having a first pulse width and a first pulse repetition period vertically toward said upper surface of said material,
b. monitoring for an echo pulse in response to said first transmitted pulse for a preselected time after said transmitted pulse which corresponds to a preselected distance range to said surface,
c. retransmitting said first ultrasonic pulse in response to an echo pulse within said preselected time,
d. transmitting a second ultrasonic pulse having a second pulse width different from said first pulse width and a second pulse repetition period different from said first pulse repetition period vertically toward said surface in response to an absence of said echo pulse within said preselected time, and
e. monitoring for an echo pulse in response to said second transmitted pulse.

23. The method set forth in claim 22 further comprising the step of retransmitting said first pulse in accordance with said step (a) after transmitting a preselected number of said second pulses in accordance with said step (d).

24. The method set forth in claim 23 wherein said preselected number of said second ultrasonic pulses is eight.

25. The method set forth in claim 22 wherein said second pulse width is greater than said first pulse width.

26. The method set forth in claim 25 wherein said second pulse repetition period is greater than said first pulse repetition period.

27. The method set forth in claim 26 wherein said first pulse width is substantially equal to 2 milliseconds, said first pulse repetition period is substantially equal to 60 milliseconds, said second pulse width is substantially equal to ten milliseconds and said second pulse repetition period is substantially equal to 300 milliseconds.

28. A control system for use in monitoring the level of material in a storage tank comprising,
transducer means mounted at the top of said tank directing ultrasonic pulses downwardly through air toward and receiving echo response pulses reflected upwardly through air from an upper surface of said material,
means operatively connected to said transducer means to sample said echo response pulses at preselected intervals corresponding to apparent distance from said transducer means to said material surface,
means converting said sampled response pulses to digital signals each having a numerical value indicative of the intensity of a corresponding response pulse relative to the other sampled response pulses,
means operatively connected to said transducer means transmitting a first ultrasonic pulse having a first pulse width and a first pulse repetition period downwardly toward said material surface, means operatively connected to said converting means comparing digitized echo response pulses from said first transmitted pulse to a preselected response threshold within a preselected time interval after said transmitted pulse, said time interval corresponding to a preselected distance range from said transducer means to said surface, means operatively connected to said comparing means and to said first pulse transmitting means retransmitting said first pulse in response to a digitized echo pulse from said first transmitted pulse above said threshold and within said interval, means operatively connected to said transducer means and to said comparing means transmitting a second ultrasonic pulse having a second pulse width and a second pulse repetition period in response to an absence of a digitized response pulse from said first transmitted pulse above said threshold and within said interval, means operatively connected to said converting means integrating digitized response pulses from said second transmitted pulse over a predetermined pulse sequence of second transmitted pulses according to apparent distance of said transducer means from said surface, means operatively connected to said comparing means to provide an indication of actual distance to said surface in response to a digitized echo response pulse from said first transmitted pulse within said interval, and means operatively connected to said integrating means to provide an indication of actual distance to said surface upon completion of said pulse sequence.

29. Apparatus for measuring distance to an object on the basis of round-trip transit time of a transmitted pulse to said object and back comprising, in combination, transducer means directing pulses toward and receiving echo response pulses reflected from said object, means operatively connected to said transducer to sample said echo response pulses at preselected intervals which are a function of distance from said transducer means to said object, means converting said sampled response pulses to digital signals each having a numerical value indicative of the intensity of a corresponding response pulse relative to the other sampled response pulses, and echo peak detector means monitoring said digitized pulses to provide an indication of actual distance, said echo peak detector means comprising first digital storage register means for storing digital data, means operatively connected to said digitizing means comparing a digitized pulse in said digitizing means with digital data stored in said first storage register means, means responsive to said comparing means for storing said digitized pulse in said first storage register means when said digitized pulse is greater than said stored data, second storage register means for storing digital data, and means responsive to said comparing means to store an apparent distance associated with said digitized pulse stored in said second storage register means when said digitized pulse is greater than said stored data.

30. The combination set forth in claim 29 further comprising means integrating said sampled and digitized response pulses from successively transmitted pulses over a preselected pulse sequence according to apparent distance of said transducer means from said object, and means storing said integrated pulses serially according to apparent distance, said echo peak detector means monitoring digitized pulses at the output of said integrating means to provide said indication of actual distance upon completion of said pulse sequence.

31. The combination set forth in claim 30 further comprising display means operatively connected to said second storage register means for providing a display of said actual distance upon completion of said pulse sequence.

32. The combination set forth in claim 30 wherein said pulse sequence comprises eight pulses.

33. In an apparatus for measuring distance to an object on the basis of round-trip transit time of a transmitted pulse to and from said object, the combination comprising, transducer means transmitting pulses toward and receiving echo response pulses reflected from said object, and means responsive to elapsed time between a first of said transmitted pulses and a corresponding response pulse for regulating the pulse width of a second transmitted pulse subsequent to said first transmitted pulse as a function of said elapsed time, said subsequent pulse regulation means comprising means monitoring said response pulses to provide a first control signal when elapsed time between said first transmitted pulse and said corresponding received pulse indicates an apparent distance from said transducer means to said object within a preselected range interval, means monitoring said response pulses to provide a second control signal when said apparent distance is outside of said preselected range interval and means responsive to said first and second control signals for regulating said pulse width of said second transmitted pulse.

34. The combination set forth in claim 33 wherein said first and second signal responsive means also regulates the pulse repetition period of said second transmitted pulse, and wherein said first and second signal responsive means comprises means operatively connected to said transducer means and responsive to said first control signal to produce a second transmitted pulse having a pulse width and pulse repetition period identical to that of said first transmitted pulse and means operatively connected to said transducer means and responsive to said second control signal to provide a second transmitted pulse having a second pulse width and a second pulse repetition period directly proportional to said apparent distance.

35. The combination set forth in claim 34 wherein said preselected range interval is a short-range interval and wherein said second control signal responsive means is responsive to said apparent distance being beyond said short-range interval to provide a second transmitted pulse having a greater pulse width and a greater pulse repetition period than said first transmitted pulse.

36. In a system for monitoring the level of a material on the basis of the round-trip transit time of an ultrasonic pulse between a transducer and a surface of said material, the combination comprising, means transmitting a sequence of ultrasonic pulses toward a surface of said material, means receiving echo response pulses reflected from said surface, means converting each of said echo response pulses to a digital number having a value indicative of the intensity of each of said pulses relative to one another, means integrating said response pulses from successively transmitted pulses of said sequence according to apparent distance to said surface, means selecting an integrated response pulse having highest digital value after termination of said pulse sequence, and means identifying which apparent material surface distance is associated with said highest-value integrated pulse and treating said apparent distance as actual material surface distance.

37. The combination set forth in claim 36 wherein said sequence of ultrasonic pulses comprises eight pulses.

38. The combination set forth in claim 36 further comprising display means for providing a display of said actual distance upon completion of said pulse sequence.

39. In a system for monitoring the level of a material as a function of the round-trip transit time of an ultrasonic pulse between a transducer and a surface of said material, the combination comprising, means transmitting a first ultrasonic pulse having a first pulse width and a first pulse repetition period vertically toward said surface of said material, means monitoring for an echo pulse in response to said first transmitted pulse for a preselected time after said transmitted pulse which corresponds to a preselected distance range to said surface, means retransmitting said first ultrasonic pulse in response to an echo pulse within said preselected time, means transmitting a second ultrasonic pulse having a second pulse width different from said first pulse width and a second pulse repetition period different from said first pulse repetition period vertically toward said surface in response to an absence of said echo pulse within said preselected time, and means monitoring for an echo pulse in response to said second transmitted pulse.

40. The combination set forth in claim 39 further comprising means retransmitting said first pulse after transmitting a preselected number of said second pulses.

41. The combination set forth in claim 40 wherein said preselected number of said second ultrasonic pulses is eight.

42. In a control system for use in monitoring the level of material in a storage tank, the combination comprising, transducer means directing ultrasonic pulses toward and receiving echo response pulses reflected from the upper surface of said material, means operatively connected to said transducer means to sample said echo response pulses from each transmitted pulse at preselected intervals which are a function of the distance of said material surface from said transducer means, means converting each of said sampled response pulses to digital signals having a numerical value indicative of the intensity of each said echo pulse relative to other echo pulses similarly received, and means monitoring said sampled and digitized response pulses to provide an indication of actual distance, which is a function of material level, upon completion of said pulse sequence, said monitoring means comprising first digital storage register means for storing digital data, means operatively connected to said converting means comparing said converted pulses with digital data stored in said first storage register means, means responsive to said comparing means for storing a converted pulse in said first storage register means when said converted pulse is greater than said stored data, second storage register means for storing digital data and means responsive to said comparing means to store an apparent material surface distance associated with said converted pulse stored in said second storage register means when said converted pulse is greater than said stored data.

43. In a control system for use in monitoring the level of material in a storage tank including a transducer directing ultrasonic pulses toward and receiving echo response pulses reflected from the upper surface of said material, and a control circuit operatively connected to said transducer to provide an indication of material level on the basis of the round-trip transit time of an ultrasonic pulse from said transducer to said material surface and back again, the improvement wherein said control circuit comprises means converting said echo response pulses to digital signals having a numerical value indicative of the intensity of each of said echo pulses relative to one another, and level indicating means responsive to said converting means to provide said indication of material level on the basis of the relative numerical value of said digitized response pulses.

44. The improvement set forth in claim 43 wherein said level indicating means comprises means integrating said digitized response pulses from successively transmitted pulses over a preselected pulse sequence according to apparent distance to said material surface and means monitoring said integrated pulses to provide an indication of actual distance upon completion of said pulse sequence.

45. The improvement set forth in claim 44 further comprising means operatively connected to said transducer to sample said echo response pulses at preselected intervals which are a function of distance from said transducer means to said material surface, said converting means being connected to said sampling means to convert sample response pulses to said digital signals.

46. The improvement set forth in claim 43 wherein said transducer is mounted to the top of said storage tank and is directed to transmit pulses downwardly toward and to receive pulses reflected upwardly from said material surface through an air space between said tank top and said material surface.

* * * * *

UNITED STATES PATENT OFFICE
CERTIFICATE OF CORRECTION

PATENT NO. : 4,000,650
DATED : January 4, 1977
INVENTOR(S) : SNYDER, Ellery P.

It is certified that error appears in the above-identified patent and that said Letters Patent are hereby corrected as shown below:

Column 1, Line 14 - After "top" insert -- of the --

Column 5, Line 27 - "date" should be -- data --

Column 8, Line 8 - "reveiver" should be -- receiver --

Column 8, Line 58 - "transmittr" should be -- transmitter --

Column 9, Line 12 - "shortrange" should be -- short-range --

Column 9, Line 18 - "longrange" should be -- long-range --

Column 10, Line 3 - "shortrange" should be -- short-range --

Column 10, Line 12 - "surfce" should be -- surface --

Column 10, Line 55 - "recevier" should be -- receiver --

Column 11, Line 17 - "mpa" should be -- map --

Column 11, Line 28 - "rotray" should be -- rotary --

Column 11, Line 56 - "voltge" should be --voltage --

Column 12, Line 54 - "grund" should be -- ground --

Column 12, Line 58 - After "of" second occurrence insert --a --

UNITED STATES PATENT OFFICE
CERTIFICATE OF CORRECTION

Patent No. 4,000,650          Dated January 4, 1977

Inventor(s) Ellery P. Snyder

It is certified that error appears in the above-identified patent and that said Letters Patent are hereby corrected as shown below:

Column 13, Line 6 - After "200" insert -- to --

Column 13, Line 15 - "abosrber" should be -- absorber --

Column 13, Line 51 - "digitzesd" should be -- digitized --

Column 13, Line 62 - "st" should be -- set --

Column 14, Line 1 - "sotrage reister" should be -- storage register --

Column 14, Line 46 - "transudcer" should be -- transducer --

Column 14, Line 47 - "surfce" should be -- surface --

Column 15, Line 11 - "subsequet" should be -- subsequent --

UNITED STATES PATENT OFFICE
CERTIFICATE OF CORRECTION

Patent No. 4,000,650          Dated  January 4, 1977

Inventor(s) Ellery P. Snyder

It is certified that error appears in the above-identified patent and that said Letters Patent are hereby corrected as shown below:

Column 15, Line 12 - "ulse" should be -- pulse --

Column 15, Line 12 - "elapased" should be -- elapsed --

Column 15, Lines 17 and 18 - "relfected" should be --reflected--

Column 15, Line 32 - "porvide" should be -- provide --

Column 15, Line 33 - "contro" should be -- control --

Signed and Sealed this

Seventeenth Day of May 1977

[SEAL]

Attest:

RUTH C. MASON
*Attesting Officer*

C. MARSHALL DANN
*Commissioner of Patents and Trademarks*

REEXAMINATION CERTIFICATE (2724th)

United States Patent [19]
Snyder

[11] B1 4,000,650
[45] Certificate Issued Nov. 14, 1995

[54] METHOD AND APPARATUS FOR ULTRASONIC MATERIAL LEVEL MEASUREMENT

[75] Inventor: Ellery P. Snyder, Norwalk, Conn.

[73] Assignee: Endress+Hauser GmbH & Co., Maulburg, Germany

Reexamination Request:
No. 90/003,748, Mar. 14, 1995

Reexamination Certificate for:
Patent No.: 4,000,650
Issued: Jan. 4, 1977
Appl. No.: 560,244
Filed: Mar. 20, 1975

Certificate of Correction issued May 17, 1977.

[51] Int. Cl.$^6$ .................................................. G01F 23/28
[52] U.S. Cl. .................... 73/290 V; 367/95; 367/108; 367/900; 367/901; 367/908
[58] Field of Search ................ 73/290 V; 367/95, 367/108, 900, 901, 908

[56] References Cited

U.S. PATENT DOCUMENTS

| | | | |
|---|---|---|---|
| 2,943,296 | 6/1960 | Fryklund | 73/290 V |
| 3,314,045 | 4/1967 | Williamson et al. | 367/98 |
| 3,380,018 | 4/1968 | Littrell et al. | 367/98 |
| 3,422,435 | 1/1969 | Cragon et al. | 342/91 |
| 3,449,710 | 7/1969 | Moss, Jr. | 367/98 |
| 3,454,922 | 7/1969 | Dory | 367/97 |
| 3,505,637 | 4/1970 | Abruzzo | 367/98 |
| 3,631,483 | 12/1971 | Ruggles | 342/185 |
| 3,723,960 | 3/1973 | Harris | 367/127 |
| 3,921,122 | 11/1975 | Christoff | 336/58 |
| 4,312,053 | 1/1982 | Lipsky | 367/127 |

OTHER PUBLICATIONS

"Donar: A Computer Processing System To Extend Ultrasonic Pulse–Echo Testing" Ultrasonics: Jul. 1973.
"Trapping Transients Digitally", David J. Blecki, Electronic Products: May 21, 1973.

*Primary Examiner*—William A. Cuchlinski, Jr.

[57] ABSTRACT

Ultrasonic pulses are transmitted from the top of a tank or bin by a transducer and reflected by the material contained therein and received by the same transducer. In the short range mode, two millisecond pulses at sixty second intervals provide a measurment of from two to twenty one feet. Failure to detect a reflected pulse in the short range mode automatically switches the device to the long range mode utilizing ten millisecond pulses at three hundred millisecond intervals. After a pulse is transmitted the energy received by the receiver is converted to a digital value each millisecond and compared to the highest previously converted digital value so that the time of the largest received reflection signal and consequently the distance to the material surface may be determined. The echo signals from eight successive long range pulses are digitized and then integrated according to apparent object distance so that the sum of the true echo signals returned from the material surface is substantially greater than the sum of random noise signals for each transmitted pulse. After each eight-pulse long-range sequence, apparatus electronics automatically return to the short-range measurement mode to start a subsequent measurement sequence.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–46 is confirmed.

* * * * *